United States Patent Office 2,934,549
Patented Apr. 26, 1960

2,934,549

2-TRIFLUOROMETHYLPROPYL CHLOROSILANES AND SILOXANES

Paul Tarrant and George W. Dyckes, Gainesville, Fla., assignors, by mesne assignments, to Dow Corning Corporation, Midland, Mich., a corporation of Michigan No Drawing. Application September 10, 1956
Serial No. 608,667

6 Claims. (Cl. 260—448.2)

This invention relates to organosilanes and siloxanes in which some of the substituents on the silicon contain fluorine atoms.

It is the primary object of this invention to prepare novel organosilicon compounds which are useful as lubricants, water repellent agents and dielectric fluids and which are useful in the preparation of siloxane resins and rubbers having increased solvent resistance.

This invention relates to chlorosilanes of the formula

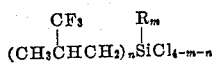

in which $n$ is an integer from 1 to 2 inclusive, R is of the group saturated aliphatic hydrocarbon radicals and aromatic hydrocarbon radicals and $m$ has a value from 0 to 2 inclusive.

The chlorosilanes of this invention are best prepared by reacting the olefin

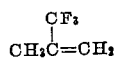

with chlorosilanes of the formula

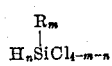

This reaction is best carried out at a temperature from 150 to 300° C. It may be carried out in the presence or the absence of a catalyst. Suitable catalysts include activated platinum on charcoal.

For the purpose of this invention R can be any saturated aliphatic hydrocarbon radical such as methyl, ethyl, isopropyl, and octadecyl or any aryl hydrocarbon radical such as phenyl, xenyl, tolyl, or naphthyl. Specific examples of chlorosilanes which can be employed to make the silanes of this invention are trichlorosilane, dichlorosilane, methyldichlorosilane, dimethylchlorosilane, phenyldichlorosilane, and octadecyldichlorosilane.

This invention also relates to siloxanes of the unit formula

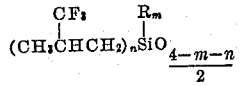

in which $n$, R and $m$ are as above defined. These siloxanes can be prepared by hydrolyzing the corresponding chlorosilanes supra in any suitable manner. If desired, the hydrolysis can be carried out in the presence of solvents such as ether, toluene, xylene, or other hydrocarbons.

The chlorosilanes of this invention are useful per se to render ceramic surfaces water repellent. The siloxanes of this invention are useful per se as lubricants.

The following examples are illustrative only and should not be construed as limiting the invention which is properly set forth in the appended claims.

Example 1

101 g. of 2-trifluoromethylpropene, 212 g. of methyldichlorosilane and .5 g. of activated platinum catalyst supported on charcoal were added to a pressure reactor. The charcoal contained 5% by weight platinum. The reactor was then heated for 16 hours at 225 to 250° C. Upon distillation of the product the compound 2-trifluoromethylpropylmethyldichlorosilane boiling 139° C. at 755 mm. was obtained. This material has an $n_D^{24}$ of 1.3936 and a $d_4^{20}$ of 1.2322.

Example 2

400 ml. of 2-trifluoromethylpropylmethyldichlorosilane were added dropwise over a period of 4 hours with rapid stirring to an ice cooled mixture of 400 ml. of ether and 800 ml. of water. The ether solution was separated, washed several times with water and dried over anhydrous calcium sulfate. The product was distilled and there was obtained the cyclic compound

boiling 117.5° C. at 3 mm. and having an $n_D^{26.3}$ of 1.3798 and $d_4^{18}$ of 1.2215; the cyclic siloxane of the formula

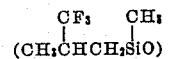

boiling 154 to 156° C. at 3 mm. and having an $n_D^{25.4}$ of 1.3858 and a $d_4^{18}$ of 1.2370 and a distillation residue which was composed of a mixture of higher molecular weight siloxanes of the unit formula

Example 3

When 1 mol of 2-trifluoromethylpropene is reacted with 2 mols of the following chlorosilanes, the following chlorosilanes of this invention are obtained:

| | |
|---|---|
| Dichlorosilane | Bis-2-trifluoromethylpropyldichlorosilane. |
| Trichlorosilane | 2-trifluoromethylpropyltrichlorosilane. |
| Dimethylchlorosilane | 2-trifluoromethylpropyldimethylchlorosilane. |
| Phenyldichlorosilane | 2-trifluoromethylpropylphenyldichlorosilane. |
| Octadecyldichlorosilane | 2-trifluoropropyloctadecyldichlorosilane. |
| Xenyldichlorosilane | 2-trifluoropropylxenyldichlorosilane. |

Example 4

When the following chlorosilanes are hydrolyzed in accordance with the procedure of Example 2, siloxanes having the following unit formulae are obtained:

| | |
|---|---|
| Bis-2-trifluoromethylpropyldichlorosilane. | $(CH_3\overset{CF_3}{\underset{\|}{C}}HCH_2)_2SiO.$ |
| 2-trifluoromethylpropyltrichlorosilane | $CH_3\overset{CF_3}{\underset{\|}{C}}HCH_2SiO_{1.5}.$ |
| 2-trifluoromethylpropyldimethylchlorosilane. | $CH_3\overset{CF_3}{\underset{\|}{C}}HCH_2(CH_3)_2SiO_{.5}.$ |
| 2-trifluoromethylpropylphenyldichlorosilane. | $CH_3\overset{CF_3}{\underset{\|}{C}}HCH_2(C_6H_5)SiO.$ |
| 2-trifluoropropyloctadecyldichlorosilane. | $CH_3\overset{CF_3}{\underset{\|}{C}}HCH_2(C_{18}H_{37})SiO.$ |
| 2-trifluoropropylxenyldichlorosilane | $CH_3\overset{CF_3}{\underset{\|}{C}}HCH_2(C_6H_5C_6H_4)SiO.$ |

That which is claimed is:

1. A chlorosilane of the formula

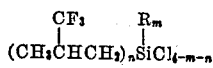

in which $n$ is an integer from 1 to 2 inclusive, R is selected from the group consisting of saturated aliphatic hydrocarbon radicals and aryl hydrocarbon radicals, $m$ has a value from 0 to 2 inclusive and the sum of $m$ and $n$ is no greater than 3.

2. 2-trifluoromethylpropylmethyldichlorosilane.

3. A siloxane of the unit formula

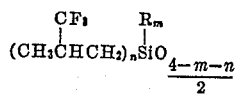

in which $n$ is an integer from 1 to 2 inclusive, R is selected from the group consisting of saturated aliphatic hydrocarbon radicals and aryl hydrocarbon radicals, $m$ has a value from 0 to 2 inclusive and the sum of $m$ and $n$ is no greater than 3.

4. A siloxane of the unit formula

5. A cyclic siloxane of the formula

6. A cyclic siloxane of the formula

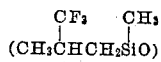

References Cited in the file of this patent

UNITED STATES PATENTS

| | | |
|---|---|---|
| 2,458,944 | Hyde | Jan. 11, 1949 |
| 2,486,162 | Hyde | Oct. 25, 1949 |
| 2,637,738 | Wagner | May 5, 1953 |

OTHER REFERENCES

Pierce et al.: "Jr. Am. Chem. Soc.," vol. 75 (1953), p. 5618–20.

McGregor: "Silicones and Their Uses," McGraw-Hill Book Co., Inc., New York, publishers (1954), p. 268–272.

McBee et al.: ibid, vol. 77 (1955), p. 1292–3.

Tarrant: "Development of Fluoro-Silicone Elastomers," Wright Air Development Center Technical Report 55–220 (August 1955), p. 12, 13, 21, 22 and 37.

UNITED STATES PATENT OFFICE
CERTIFICATE OF CORRECTION

Patent No. 2,934,549            April 26, 1960

Paul Tarrant et al.

It is hereby certified that error appears in the printed specification of the above numbered patent requiring correction and that the said Letters Patent should read as corrected below.

Column 2, lines 27 to 29, and column 4, lines 6 to 8, the formula, in each occurrence, should appear as shown below instead of as in the patent:

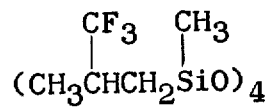

Signed and sealed this 27th day of September 1960.

(SEAL)
Attest:

KARL H. AXLINE
Attesting Officer

ROBERT C. WATSON
Commissioner of Patents